United States Patent
Janson et al.

(10) Patent No.: US 11,014,834 B2
(45) Date of Patent: May 25, 2021

(54) OSMOTIC CONCENTRATION OF PRODUCED AND PROCESS WATER USING HOLLOW FIBER MEMBRANE

(71) Applicant: ConocoPhillips Company, Houston, TX (US)

(72) Inventors: Arnold Janson, Doha (QA); Samer Adham, Doha (QA); Joel Minier-Matar, Doha (QA); Altaf Hussain, Doha (QA); Ana M. Santos, Doha (QA)

(73) Assignee: CONOCOPHILLIPS, Houston, TX (US)

( * ) Notice: Subject to any disclaimer, the term of this patent is extended or adjusted under 35 U.S.C. 154(b) by 384 days.

(21) Appl. No.: 15/585,920

(22) Filed: May 3, 2017

(65) Prior Publication Data
US 2017/0369338 A1    Dec. 28, 2017

Related U.S. Application Data

(60) Provisional application No. 62/353,422, filed on Jun. 22, 2016.

(51) Int. Cl.
*C02F 1/44* (2006.01)
*B01D 61/00* (2006.01)
(Continued)

(52) U.S. Cl.
CPC ........... *C02F 1/445* (2013.01); *B01D 61/002* (2013.01); *B01D 63/04* (2013.01); *B01D 69/081* (2013.01);
(Continued)

(58) Field of Classification Search
CPC .... C02F 1/445; C02F 2103/08; B01D 61/002; B01D 63/04; B01D 2317/022; B01D 69/081; B01D 2315/06; Y02A 20/131
See application file for complete search history.

(56) References Cited

U.S. PATENT DOCUMENTS 8,029,671 B2   10/2011   Cath et al.
8,181,794 B2   5/2012    McGinnis et al.
(Continued)

FOREIGN PATENT DOCUMENTS

CN    103739038    4/2014
WO    2011090548   6/2011
(Continued)

OTHER PUBLICATIONS

Wang, R., et al—"Characterization of Novel Forward Osmosis Hollow Fiber Membranes", 2010, Journal of Membrane Science, 355, Elsevier, pp. 158-167; 10 pgs.
(Continued)

*Primary Examiner* — Krishnan S Menon
(74) *Attorney, Agent, or Firm* — Boulware & Valoir

(57) ABSTRACT

The invention relates to a method and apparatus for treatment of produced or process water from hydrocarbon production to reduce the volume of the produced or process water while simultaneously reducing the salinity of a highly saline stream, for example, the brine from a seawater desalination plant. The method includes causing a feed stream comprising produced or process water to flow through the lumen of a hollow fiber osmotic membrane 4 which is immersed in an open channel 2 or tank of flowing draw solution 6 which has high salinity. In this way, water from the feed stream is drawn through the osmotic membrane 4 by an osmotic pressure differential caused by the difference in salinity between the feed stream and the draw solution 6.

16 Claims, 2 Drawing Sheets

(51) Int. Cl.
    *B01D 63/04* (2006.01)
    *B01D 69/08* (2006.01)
    *C02F 103/08* (2006.01)

(52) U.S. Cl.
    CPC .... *B01D 2315/06* (2013.01); *B01D 2317/022* (2013.01); *C02F 2103/08* (2013.01); *Y02A 20/131* (2018.01)

(56) References Cited

U.S. PATENT DOCUMENTS

| | | | |
|---|---|---|---|
| 8,216,474 | B2 | 7/2012 | Cath et al. |
| 9,039,899 | B2 | 5/2015 | McGinnis |
| 9,216,917 | B2 | 12/2015 | Carmignani et al. |
| 9,550,728 | B2 | 1/2017 | Lee et al. |
| 2012/0267306 | A1* | 10/2012 | McGinnis ............ B01D 61/002 210/637 |
| 2014/0001122 | A1 | 1/2014 | Schultz et al. |
| 2014/0151300 | A1 | 5/2014 | Sagave et al. |
| 2014/0151295 | A1 | 6/2014 | Heon et al. |

FOREIGN PATENT DOCUMENTS

| | | |
|---|---|---|
| WO | 2013003607 | 1/2013 |
| WO | 2013134710 | 9/2013 |
| WO | 2013148289 | 10/2013 |

OTHER PUBLICATIONS

Minter-Matar. Joel, et al—"Advances in Application of Forward Osmosis Technology for Volume Reduction of Produced/Process Water from Gas-Field Operations", Dec. 2015, IPTC-18380-MS, 6-9; pp. 1-15; 15 pgs.

Minier-Matar, Joel, et al—"Application of Forward Osmosis for Reducing Volume of Produced/Process Water from Oil and Gas Operations", 2015, Desalination 376 pp. 1-8; 8 pgs.

Minier-Matar, Joel, et al—"Application of Hollow Fiber Forward Osmosis Membranes for Produced and Process Water Volume Reduction: An Osmotic Concentration Process", 2016, Environmental Science & Technology 50, No. 11, 6044-6052, pp. A-I; 9 pgs.

R. Valladares Linares, Z. Li, V. Yangali-Quintanilla, N. Ghaffour, G. Amy, T. Leiknes, J.S. Vrouwenvelder, Life cycle ;ost of a hybrid forward osmosis — low pressure reverse osmosis system for seawater desalination and wastewater -ecovery, Water Research, vol. 88, 1 Jan. 2016, pp. 225-234.

Mengxi Zhang, Renxiao Liu, Zhouwei Wang, Baolong Zhao, Jianfeng Song, Myoung Jun Park, Ho Kyong Shon, Xue-Vlei Li, Tao He, Dehydration of forward osmosis membranes in treating high salinity wastewaters: Performance and implications, Journal of Membrane Science, vol. 498, Jan. 15, 2016, pp. 365-373.

Pin Zhao, Baoyu Gao, Qinyan Yue, Sicheng Liu, Ho Kyon Shon, Effect of high salinity on the performance of forward osmosis: Water flux, membrane scaling and removal efficiency, Desalination, vol. 378, Jan. 15, 2016, pp. 67-73

Bryan D. Coday, Christiane Hoppe-Jones, Daniel Wandera, Jayraj Shethji, Jack Herron, Keith Lampi, Shane A. Snyder, Tzahi Y. Cath, Evalution of the transport parameters and physiochemical properties of forward osmosis membranes after treatment of produced water, Journal of Membrane Science, vol. 499, Feb. 1, 2016, pp. 491-502.

Shahzad Jamil, Paripurnanda Loganthan, Christian Kazner, Saravanmuth Vigneswaran, Forward Osmosis treatment for volume minisation of reverse osmosis concentrate from a water reclamation plant and removal of organic micropollutants, Desalination, vol. 372, Sep. 15, 2015, pp. 32-38.

Zh Qian, Xinchun Liu, Zhishen Yu, Hongxun Zhang, Yiwen Jü, A Pilot-scale Demonstration of Reverse Osmosis Unit for Treatment of Coal-bed Methane Co-produced Water and its modeling, Chinese Journal of Chemical Engineering, vol. 20, Issue 2, Apr. 2012, pp. 302-311.

Kerri L. Hickenbottom, Nathan T. Hancock, Nathan R. Hutchings, Eric W. Appleton, Edward G. Beaudry, Pei Xu, Tzahi Y. Cath, Forward osmosis treatment of drilling mud and fracturing wastewater from oil and gas operations, Desalination, vol. 312, Mar. 1, 2013, pp. 60-66.

Bryan D. Coday, Leslie Miller-Robbie, Edward G. Beaudry, Junko Munakata-Marr, Tzahi Y. Cath, Life cycle and economic assesments of engineered osmosis and osmotic dilution for desalination of Haynesville shale pit water, Desalination, vol. 369, Aug. 3, 2015, pp. 188-200.

Sherub Phuntsho, Fezeh Lotfi, Seungkwan Hong, Devin L. Shaffer, Menachem Elimelech, Ho Kyong Shon, Membrane scaling and flux decline during fertiliser-drawn forward osmosis desalination of brackish groundwater, Water Research, vol. 57, Jun. 15, 2014, pp. 172-182.

Tzahi Y. Cath, Menachem Elimelech, Jeffrey R. McCutcheon, Robert L. McGinnis, Andrea Achilli, Daniel Anastasio, Adam R. Brady, Amy E. Childress, Isaac V. Farr, Nathan T. Hancock, Jason Lampi, Long D. Nghiem, Ming Xie, Ngai Yin Yip, Standard Methodology for Evaluing Membrane Performance in Osmotically Driven Membrane Processes, Desalination, vol. 312, Mar. 1, 2013, pp. 31-38.

\* cited by examiner

OSMOTIC CONCENTRATION OF PRODUCED AND PROCESS WATER USING HOLLOW FIBER MEMBRANE

CROSS-REFERENCE TO RELATED APPLICATIONS

This application is a non-provisional application which claims benefit under 35 USC § 119(e) to U.S. Provisional Application Ser. No. 62/353,422 filed Jun. 22, 2016, entitled "OSMOTIC CONCENTRATION OF PRODUCED AND PROCESS WATER USING HOLLOW FIBER MEMBRANE" which is incorporated herein in its entirety.

FIELD OF THE INVENTION

This invention relates to the treatment of water in oil and gas production to reduce the volume of water for disposal and/or to modify salinity.

BACKGROUND OF THE INVENTION

In the extraction of hydrocarbons from the earth, water is often extracted concurrently with the hydrocarbons ("produced water"). Sources of the water include naturally-occurring formation water and water injected into the formation from certain types of treatment operations such as secondary operations for production enhancement (e.g. steam or water floods, formation stimulation, etc.).

This water often contains impurities and although as much as possible is reused, some water must usually be disposed of.

Similarly, wastewater generated during the processing of oil and gas after it has been extracted ("process water") often contains impurities and, if not treated and reused, must usually be disposed of.

Disposal of produced and process water ("PPW") is normally by injection into deep wells. Reducing the volume of produced or process water may lower both pumping costs (lower volume and lower injection pressure) and the costs of any biocides or chemicals added for pH adjustment, corrosion control, biocides or reservoir protection. In addition, the hydraulic service life of the well may be extended and costs associated with the drilling of new disposal wells may be deferred or eliminated.

A separate water-related issue is reducing the salinity of water discharged to the ocean by seawater desalination plants. Throughout the world, seawater desalination is practised as a means of producing fresh water for both human consumption and other uses, including feed water for oil & gas operations. The desalination facilities generate a concentrated seawater effluent ("brine") that is typically discharged back to the environment at a salinity higher than the environment into which it is discharged. To reduce the impact of this brine on the environment and possibly for economic or regulatory purposes, there is an incentive for desalination plant operators to reduce the salinity of the brine prior to discharge. There may also be other reasons for wanting to reduce the salinity of a highly saline water stream.

The inventors have previously addressed these issues of reducing PPW volume and reducing brine salinity using commercially available flat sheet and hollow fiber forward osmosis membranes. They have established that osmotic concentration, a single-step variation of the typical two-step forward osmosis process, can be used to obtain >50% volume reduction of PPW with simultaneous dilution of desalination plant brine by up to 50%. The methodology involved the use of a custom built lab scale forward osmosis unit with separate pumps for draw solution and feed. If scaled up, this would involve custom built membrane vessels, considerable interconnecting pipework and a large overall footprint. Running costs would include maintenance of this extensive plant as well as the cost of pumping two fluids. See Minier-Matar et al., Advances in Application of Forward Osmosis Technology for Volume Reduction of Produced/Process Water from Gas-Field Operations, IPTC-18380-MS, 6-9 Dec. 2015; Minier-Matar et al., Application of Forward Osmosis for Reducing Volume of Produced/Process Water from Oil and Gas Operations, Desalination 376 (2015) 1-8; and Minier-Matar et al., Application of Hollow Fiber Forward Osmosis Membranes for Produced and Process Water Volume Reduction: An Osmotic Concentration Process, Environmental Science & Technology 50, no. 11, 6044-6052 (2016).

BRIEF SUMMARY OF THE DISCLOSURE

The invention more particularly relates to a method for the treatment of produced or process water from hydrocarbon production to reduce the volume of the produced or process water while simultaneously reducing the salinity of a highly saline stream, for example, the brine from a seawater desalination plant. The method comprises: causing a feed stream comprising produced or process water to flow through a lumen of a hollow fiber osmotic membrane and causing a draw solution comprising saline water of higher salinity than the produced or process water to flow past the outside of the hollow fiber osmotic membrane, whereby water from the feed stream is drawn through the osmotic membrane by osmotic pressure differential caused by a difference in salinity between the feed stream and the draw solution, and wherein the saline water flows in an open channel or tank and the hollow fiber osmotic membrane is arranged in an immersed membrane configuration in the open channel or tank.

It can be desirable for a produced or process water ("PPW") stream, which has contaminants which make it unsuitable for anything else but disposal, to have its volume reduced (and salinity or total dissolved solids (TDS) increased) whilst at the same time reducing the salinity of the brine from, e.g., a seawater desalination plant prior to discharge to the environment. In this situation, an osmotic concentration method may be used simultaneously to reduce the volume of the PPW and the salinity of the brine by drawing water from the PPW water to the brine.

A great cost advantage may be obtained by using the immersed membrane configuration in a draw solution (saline) channel or tank which is already present, e.g. the outlet from a desalination plant. In this way, the invention saves the costs associated with pumping the draw solution into a dedicated forward osmosis unit, with associated inter-connecting pipework. Capital costs for equipment are reduced, equipment footprint, of which a major part would normally be the membrane units, is greatly reduced since the membranes are installed in pre-existing channels or tanks. When membrane servicing is required, the cassettes can be removed without any disruption to the operation of the desalination plant operation or other plant associated with the forward osmosis system. Finally, operating costs are reduced since draw solution pumping energy is eliminated.

Immersed configuration is known in municipal water purification for water filtration, but not generally for forward osmosis systems. U.S. Pat. No. 9,227,856 describes an immersed forward osmosis system but in this system the membrane is not a hollow fiber membrane and the direction of flow is the reverse of that in the present invention: the draw solution flows internally within the membrane device which is immersed in feed water.

The use of hollow fiber osmotic membranes has the advantage that they offer very high packing density and hence require only a small equipment footprint. Also, in comparison with flat sheet membranes used in immersed applications, hollow fiber membranes are much simpler to assemble into modules and do not require internal fabric spacers to keep the flat sheets apart. These factors reduce material requirements and module fabrication cost. Immersed hollow fiber membranes also have very low pressure drops for both the feed and draw solutions.

Hollow fiber osmotic membranes are available commercially but are new to the market at the time of writing; an example method for producing such a membrane is available and is public knowledge. See, for example, Wang et. al., "*Characterization of novel forward osmosis hollow fiber membranes*", Journal of Membrane Science, 355, 158-167, (2010).

The feed stream may be passed through between 1,000 and 10,000,000 hollow fiber membranes, preferably between 50,000 and 1,000,000, in a combination of series and parallel arrangements. The feed stream may be passed through more than 2 hollow fiber membranes connected sequentially in series, such as between 2 and 10 fiber membranes in series. The membrane is normally part of a membrane module, the module comprising a plurality, such as between 250 and 5,000, of fiber membranes mounted therein with respective ends of the fiber membranes mounted in an inlet header and an outlet header of the module. Normally, two or more membrane modules are arranged in a frame, in which case the lumens of two or more fiber membranes in respective modules and/or respective frames may communicate in series.

Connecting the feed sides of osmotic membranes or membrane frames in series in an immersed configuration is not known as far as the inventors are aware, or if it is known then it is very unusual. In the present invention, having the water flow direction from the inside to the outside of immersed fiber membranes means that a greater percentage of the water in the feed water may be removed if the path length for the feed water is greater, so the path length may be adjusted to obtain the desired degree of volume reduction by connecting fibers in series.

In this invention, the flow of water through the membrane is from "inside to outside". This is in contrast to the normal immersed membrane arrangement used for water filtration where purified water is drawn from the solution in which the membrane is immersed, i.e. in an "outside-to inside" arrangement. In normal water filtration, simply providing more membranes in parallel is all that is needed to provide a desired increase the volume of the product (filtered water). There is no need to put frames in series—in fact, it would increase backpressure on the filtration process and would be undesirable.

In the technique according to the invention, the volume of the produced or process water may be reduced substantially. For example, it may be reduced by more than 25% or more than 50%; alternatively, it may be reduced by between 25% and 90%, for example between 50% and 75%.

The draw solution may be seawater, saline effluent (brine) from a water desalination plant or any groundwater of sufficient salinity to provide the necessary osmotic pressure differential to achieve the desired feed volume reduction. Whilst all these are possible and advantageous, the benefits of using desalination brine include the following: (i) salinity is higher than seawater and that increases osmotic pressure differential and flux; (ii) additional pretreatment is not required since pretreatment is normally already incorporated in the desalination plant; and (iii) thermal desalination plant brine is typically warm and that improves membrane flux.

The salinity of brine (desalination plant effluent) which can be used as a draw solution is normally in the range 50 to 75 g TDS/L. Draw solution of a lower salinity, such as seawater with salinity 30 to 47 g TDS/L, may also be used. Hypersaline groundwater, with salinity normally between about 30 and 300 g TDS/L, could also be used as a draw solution.

The reduction of the draw solution salinity can range from as little as 1% to as much 75% or even higher as long as sufficient osmotic pressure differential is maintained to obtain adequate water flow through the membrane. For example, the salinity may be reduced by between 5% and 50%; optionally, it may be reduced by between 10% and 25%.

The feed stream has an initial salinity (TDS) lower than the salinity (TDS) of the draw solution. The initial or upstream salinity of the feed stream may be between 0.5 and 50 g TDS/L, such as between 1 and 10 g TDS/L. Downstream of the membranes the salinity of the feed stream may be between 1 and 100 g TDS/L, such as between 2 and 20 g TDS/L.

The feed stream, having had its volume reduced substantially, may be taken off downstream of the membranes and injected into a deep well for disposal. It may receive further treatment first, if necessary. The diluted draw solution may be taken off downstream of the membranes and passed into (or back into) a desalination process to produce fresh water.

If the draw solution is efflux (brine) from a desalination plant, then it may be possible to recycle the treated brine back into the desalination plant since its salinity has been reduced by the osmotic process. Alternatively, the draw solution may be passed into the sea; the reduced salinity of the draw solution downstream of the membranes may mean its salinity is more matched to the seawater, making disposal into the sea more acceptable from an environmental standpoint.

The osmotic differential may be in the range 5 to 250 bar, optionally 10 to 60 bar.

The produced or process water may be subject to pretreatment processes including suspended solids removal and oil removal, prior to entering the forward osmosis membranes.

The interior diameter of the lumens of the hollow fiber membranes may be between 0.1 mm and 2.0 mm and the length of each hollow fiber membrane may be between 0.25 m and 2.0 m. To achieve sufficient volume reduction, the feed water may be passed through a series of sequentially connected fiber membranes of total length between 0.25 m and 20 m, optionally between 1 m and 10 m, such as between 2 m and 5 m, wherein the internal diameter of the fiber lumen may be between 0.1 mm and 2.0 mm, optionally between 0.6 mm and 1.6 mm.

Although not the current preferred solution, in the future it may be convenient to make a module comprising longer fibers, in which case the values given above for the total length may apply to a single continuous fiber or to a set of sequentially connected fibers in which each individual fiber is longer than 2.0 m. Therefore, the total length of fiber through which the feed solution is passed, regardless of the number of individual fibers, may be between 0.25 m and 20 m, optionally between 1 m and 10 m, such as between 2 m and 5 m.

To ensure that the water flowing through the membrane is quickly mixed with the draw solution (to keep the salinity differential high), a possibility is to pass air bubbles through the modules. This can be described as aeration. Aeration can be provided by passing air through coarse bubble diffusers under the frames—the rising air bubbles may help mix the water with the brine. In order to save energy, aeration may be provided intermittently.

In another aspect, the invention relates to apparatus for the treatment of produced or process water from hydrocarbon production to reduce the volume of the produced or process water, the apparatus comprising a plurality of hollow fiber osmotic membranes mounted in modules adapted for immersion in an open channel or tank comprised of draw solution, wherein at least two of said fiber membranes communicate in series.

Normally, two or more membrane modules are provided, and the lumen of at least one fiber membrane in one of modules communicates in series with the lumen of at least one fiber membrane in another of the modules. The modules are normally arranged in one or more frames adapted for immersion in an open channel or tank. Where a number of frames are used, the lumen of at least one fiber membrane in one of said frames may communicate in series with the lumen of at least one fiber membrane in another frame.

The invention also extends to a system comprising this apparatus installed in an immersed configuration in an open channel or tank containing flowing draw solution, together with a pumped supply of produced or process water communicating with the lumens of the fiber membranes, the draw solution in the open channel or tank having a higher salinity than the produced or process water.

The system may, to ensure proper performance and environmental protection, include membrane integrity monitoring, either through on-line instrumentation or by intermittent membrane integrity tests.

BRIEF DESCRIPTION OF THE DRAWINGS

A more complete understanding of the present invention and benefits thereof may be acquired by referring to the following description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
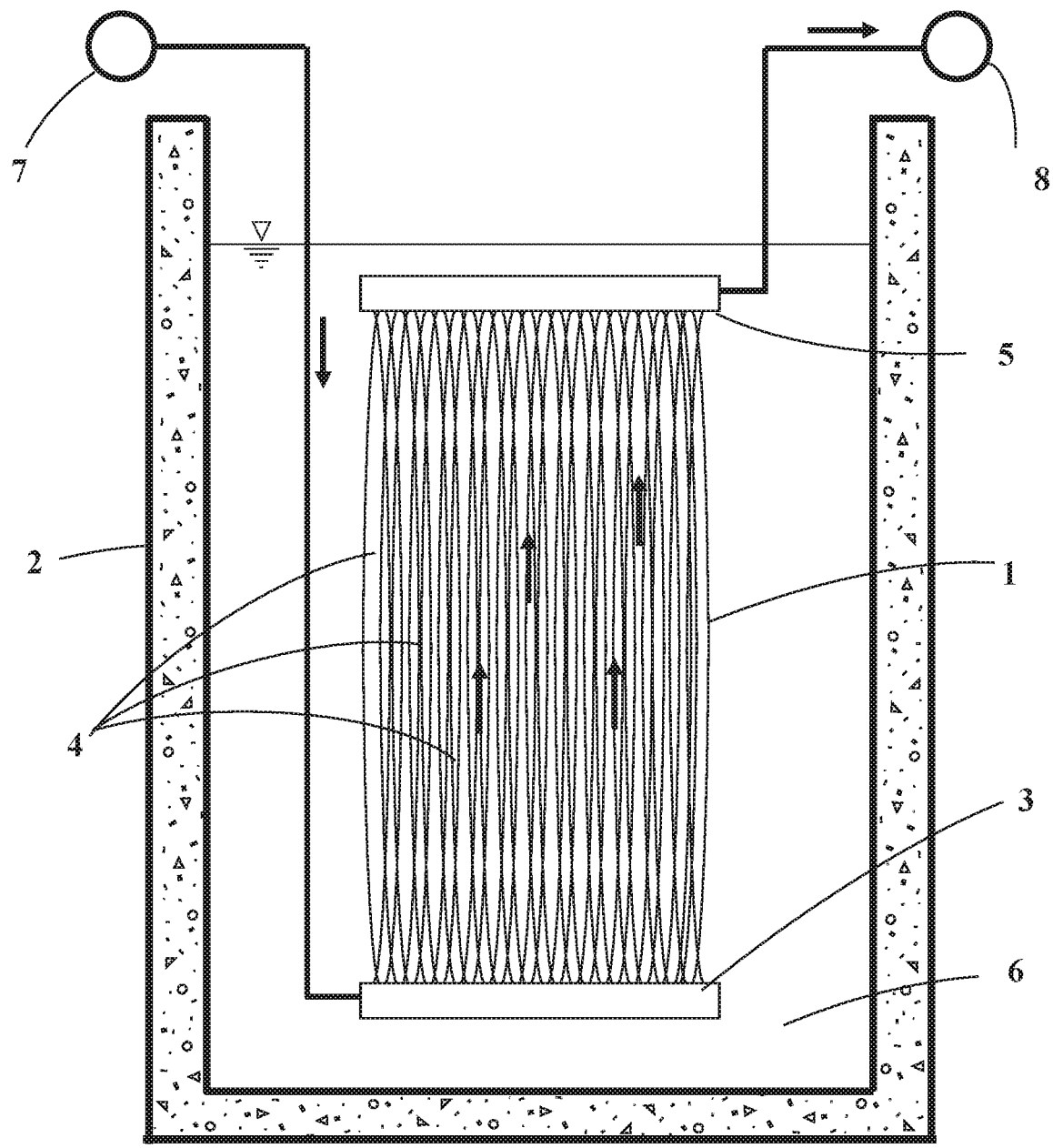
FIG. 1 is a side sectional view of a water channel in which is located an immersed hollow fiber forward osmosis module.

Referring to FIG. 1, a hollow fiber osmotic membrane module 1 is installed in an open concrete channel 2. The membrane module 1 consists of an inlet membrane header 3, a plurality of hollow fiber osmotic membranes 4 and an outlet membrane header 5. The channel 2 contains a flowing stream of high salinity draw solution 6, in this embodiment seawater. Alternatively, the draw solution 6 could be brine from a seawater desalination plant or hypersaline groundwater. A feed header 7 communicates with the inlet membrane header 3 of the module 1, whilst a concentrate header 8 communicates with the outlet membrane header 5 of the module.

In this embodiment, the module 1 has 1200 hollow fibers 4 connected in parallel between the inlet and outlet membrane headers 3, 5. However, in alternative arrangements it is possible to have the fibers divided into groups, with the fibers of each group connected in series. For example, a module may comprise 3 groups, each of 400 fibers connected in series.

Feed water, in this embodiment produced water from an oil and gas operation, is pumped to the feed header 7 and supplied from the feed header to the inlet membrane header 3. Alternatively, the feed water could be process water from nearby oil and gas processing operations or a blend of the two streams. The feed water flows upward through the osmotic membrane fibers 4. As the feed flows through the lumen of the fibers, because of the difference in salinity between the feed and the draw solution, water flows from the feed solution through the walls of the fiber and into the draw solution 6, but larger dissolved solids such as sodium or chloride ions or other impurities are unable to pass through the membrane. In this way, the feed solution is concentrated while the draw solution is diluted. The concentrated feed collects in the outlet membrane header 5 and is discharged from the system through the concentrate header 8.

The hollow fiber membrane construction can be comprised of a fabric base e.g. polypropylene, a polymer support layer, for example polyethersulfone and an active membrane separation layer made from, for example, m-phenylenediamine, caprolactam, sodium dodecyl sulfate, trimesoyl chloride and hexane by interfacial polymerization. The fiber can be constructed using information described in Wang et. al., "*Characterization of novel forward osmosis hollow fiber membranes*", Journal of Membrane Science, 355, 158-167, (2010). Other possible chemistries for hollow fiber osmotic concentration membranes include membrane separation layers from cellulose triacetate, polybenzimidazole, cellulose acetate, polyether sulfone, or polyamide on polysulfone-based, sulfonated or cellulose acetate propionate support layers. The outside diameter of a hollow fiber membrane can range from 0.5 mm to 4 mm, preferentially between 1 and 2.5 mm. The inside diameter of the fiber can range from 0.1 mm to 2 mm, preferentially 0.6 to 1.6 mm. The length of the fiber can be 0.25 to 2 m, preferentially 0.5 to 1.5 m.

One module is depicted in FIG. 1, but the system consists of multiple membrane modules assembled in frames or racks.

Figure 2:
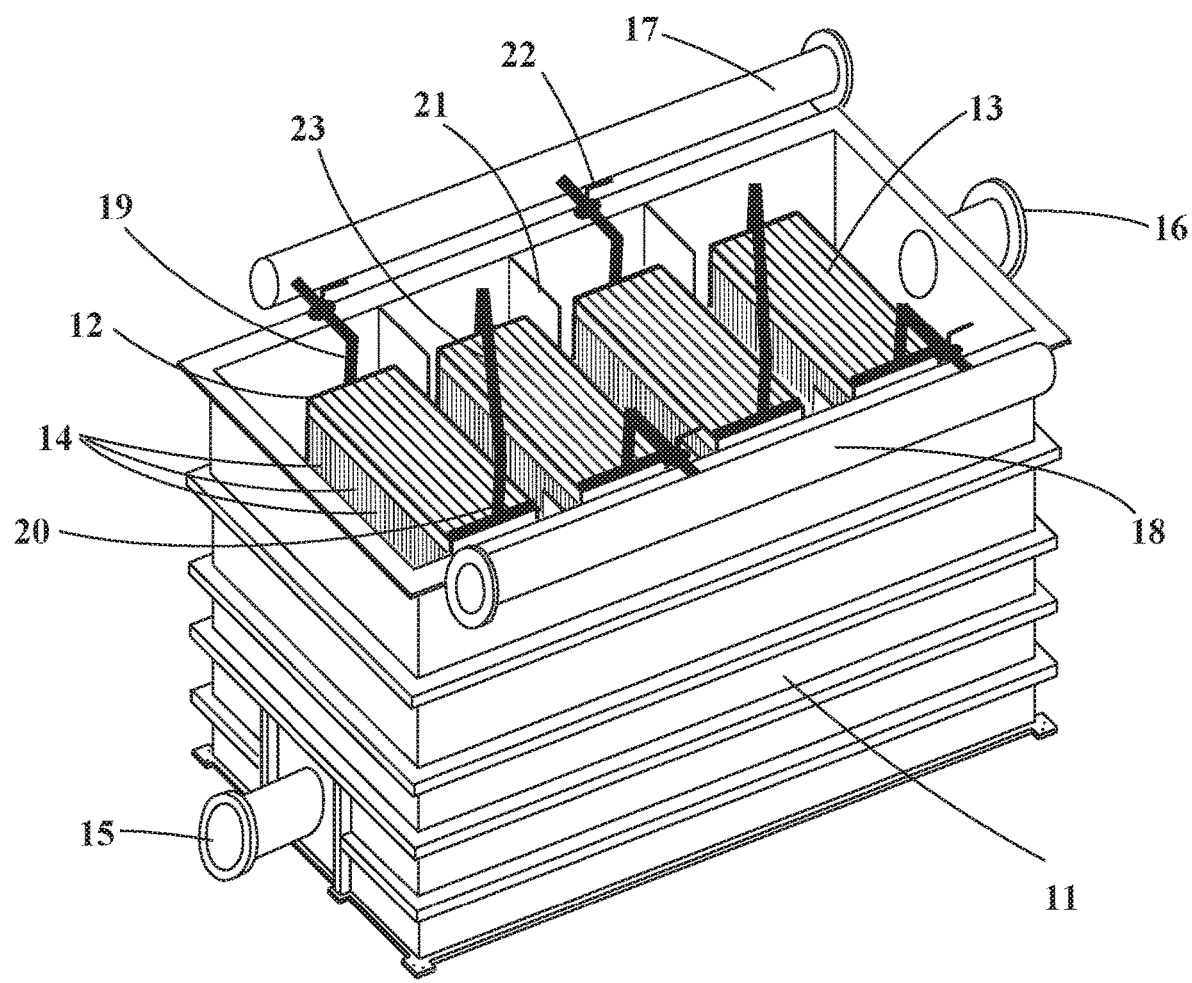
FIG. 2 is an isometric view of an open top tank containing a number of membrane frames, each frame containing a number of modules of the type shown in FIG. 1.

Referring to FIG. 2, an open top membrane tank 11 contains four membrane frames 12 each comprising an array of eight membrane modules 13. Each membrane module 13 comprises inlet and outlet headers and 1200 hollow fiber osmotic membranes 14 extending between the headers, as described above in relation to FIG. 1. The modules are configured in a parallel arrangement, whereby the feed water flows through the lumens of all fibers and all modules in parallel and is collected in the outlet pipe 20. Alternative arrangements are possible, e.g., i) more or less than 8 modules per frame, or ii) where two or more of the modules are grouped so that the feed flow is in series, first through one group of modules and then through a second or more groups of modules one after the other. The arrangement and number of modules in series can be adjusted as required to meet the required overall volume reduction. Similarly, the number of modules in a parallel configuration can be adjusted as required to meet total flow requirements.

The tank 11 includes a draw solution inlet nozzle 15, a diluted draw solution outlet nozzle 16, a produced and process water feed solution header 17 and a concentrated produced and process water header 18. The membrane frames are provided with a feed downcomer 19 and a membrane outlet pipe 20. Between the membrane frames, vertical baffles 21 can be provided to prevent draw solution from bypassing the membrane frames. Similarly, valves 22 can be provided at appropriate places to facilitate frame isolation and maintenance.

In a similar manner to the arrangement of the modules, the frames can be arranged in series or parallel or a combination, as required to achieve the required flow rate and volume reduction. In this example, the four frames are configured in two parallel sets; each set comprised of two frames connected in series, i.e. the outlet 20 from one frame connected to the inlet downcomer 19 on the adjacent frame by crossover pipe 23. The configuration of the number of frames in parallel and series is flexible and is dependent of application specific criteria.

In operation, the higher salinity draw solution, e.g. seawater or concentrated brine, enters the tank through nozzle 15 and flows amongst and between the fibers. The lower salinity feed solution, e.g. the produced and process water from oil and gas operations, is pumped into the feed solution header 17, flows downward through the downcomers 19 and flows upward through the lumen of the hollow fiber osmotic membranes 14.

As noted in the description for FIG. 1, water flows from the lumen through the wall of the osmotic membrane fiber and into the draw solution because of the difference in salinity. The vast majority of the other materials in the feed do not pass through the membrane and hence become concentrated in the feed. The concentrated feed solution is collected in the outlet pipe 20.

If sufficient volume reduction has been achieved, the concentrated feed can be discharged to the header 18 ultimately to be discharged; if additional volume reduction is required, the concentrated feed can be routed via the crossover pipe 23 to the downcomer 19 on another frame in a series configuration. The diluted draw solution exits the tank through the outlet nozzle 16 and can be discharged, e.g. to another membrane tank, to the sea or returned as feed to the desalination plant.

Example 1

The objective in this design example is two-fold: i) reduce the volume of a 50 m³/h feed stream of produced and process water by 50%, and ii) simultaneously reduce the salinity of a 100 m³/h thermal desalination plant brine by 25%. 60 osmotic membrane fiber modules are assembled in a frame, each module arranged vertically with its inlet membrane header at the bottom and outlet membrane header at the top, the membrane headers communicating respectively with a feed header and a concentrate header on the frame. Each module comprises 1,500 fiber membranes, each membrane having a length of 1.5 m and an inner lumen diameter of 1 mm.

A detailed description of how to make the fiber membranes can be found in the Wang article, full details of which are cited above, together with U.S. Pat. No. 8,181,794 (McGinnis et al.). Briefly, the fibers are made of a polyamide membrane separation layer as described in the Wang article on a polyethylene terephthalate support layer on a polypropylene fabric base as described in the McGinnis patent. The membrane separation layer is created by an interfacial polymerization technique. A solution of m-phenylenediamine (MPD) is brought into contact with the surface of the substrate, followed by interaction with a trimesoyl chloride (TMC) and hexane solution. Between the contact of the fibers with MPD and TMC solutions, a drier is used to remove droplets on the surface of the fibers. The fiber membranes have a design flux of about 15 l/m²-h.

4 frames are installed in an open channel carrying 100 m³/h of brine, having a salinity of 60 g TDS/L. The 50 m³/h feed stream having a salinity of 2 g TDS/L is pumped through the membrane fibers. The average osmotic pressure differential is estimated to be 44.5 bar assuming 35° C. temperatures for both streams. The calculations below indicate that 4 such frames will provide the desired reduction in feed stream volume. These 4 frames will be configured into 2 sets, each with 2 frames in series. Details are given in Table 1 below.

TABLE 1

| | |
|---|---|
| Fiber ID | 1 mm |
| Fiber length | 1.5 m |
| Design flux | 14.7 L/m²-h |
| Feed flow | 50 m³/hr |
| Feed volume reduction | 50% |
| Draw solution salinity reduction | 25% |
| Modules/frame | 60 |
| Fibers per module | 1500 |
| Feed velocity inside fiber | 9.83 cm/s |
| Area/fiber | 0.00471 m² |
| Flow/fiber | 0.0694 l/h per fiber |
| No. of fibers needed | 360,000 |
| No. of modules | 240 |
| No. of frames | 4.0 |
| Feed flow/set of frames | 25 m³/hr |
| No. of sets of frames | 2 |
| No. of frames in series per set | 2 |
| Salinity of upstream draw solution | 60 g TDS/L |
| Salinity of downstream draw solution | 48 g TDS/L |
| Salinity of the feed PPW | 2 g TDS/L |
| Salinity of the concentrated PPW | 4 g TDS/L |
| Average osmotic pressure differential | 44.5 bar |

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication date after the priority date of this application. Incorporated references are listed again here for convenience:
1. Wang, R., et al., "*Characterization of novel forward osmosis hollow fiber membranes*", JMS, 355, 158-167. (2010)
2. Minier-Matar et al., "Advances in Application of Forward Osmosis Technology for Volume Reduction of Produced/Process Water from Gas-Field Operations", IPTC-18380-MS, 6-9 December 2015
3. Minier-Matar et al., "*Application of Forward Osmosis for Reducing Volume of Produced/Process Water from Oil and Gas Operations*", Desalination 376 (2015) 1-8
4. Minier-Matar et al., "Application of Hollow Fiber Forward Osmosis Membranes for Produced and Process Water Volume Reduction: An Osmotic Concentration Process", Environmental Science & Technology 50, No. 11, 6044-6052 (2016).

The invention claimed is:

1. A method for the treatment of produced or process water (PPW) from hydrocarbon production to reduce the volume of the PPW, the method comprising:
   a) causing a feed stream comprising PPW to flow through a lumen of a hollow fiber osmotic membrane;
   b) causing a draw solution comprising saline water of higher salinity than the feed stream to flow past an outside of the hollow fiber osmotic membrane;
   wherein the draw solution flows in an open channel or open tank and the hollow fiber osmotic membrane is immersed in the draw solution; and
   whereby water from the feed stream is drawn through the hollow fiber osmotic membrane and into said draw solution by an osmotic pressure differential caused by said higher salinity of said draw solution.

2. The method claimed in claim 1, wherein the feed stream is passed through between 1,000 and 10,000,000 hollow fiber membranes, in a combination of series and parallel arrangements.

3. The method claimed in claim 2, wherein the feed stream is passed through more than 2 hollow fiber membranes connected in series.

4. The method claimed in claim 1, wherein the hollow fiber osmotic membrane is part of a membrane module, the membrane module comprising a plurality, of hollow fiber osmotic membranes mounted in the membrane module with respective ends of the hollow fiber osmotic membranes mounted in an inlet header and an outlet header of the membrane module.

5. The method of claim 4, wherein two or more of said membrane modules are arranged in a frame.

6. The method of claim 5, wherein the lumens of two or more hollow fiber osmotic membranes in respective modules and/or respective frames communicate in series.

7. The method claimed in claim 1, wherein the volume of the PPW is reduced by more than 50%.

8. The method claimed in claim 1, wherein the volume of the PPW is reduced by between 25% and 90%.

9. The method claimed in claim 1, wherein the draw solution is seawater, saline effluent from a water desalination plant or hypersaline groundwater.

10. The method claimed in claim 1, further comprising taking the feed stream from downstream of the hollow fiber osmotic membranes and injecting it into a disposal well.

11. The method claimed in claim 1, further comprising taking the feed stream from downstream of the hollow fiber osmotic membranes and treating it further prior to disposal.

12. The method claimed in claim 1, further comprising taking the draw solution from downstream of the hollow fiber osmotic membranes and passing it into a desalination process or into the sea.

13. The method as claimed in claim 1, wherein the osmotic pressure differential is in the range of 5 to 250 bar.

14. The method as claimed in claim 1, wherein the PPW is pretreated by suspended solids removal and oil removal.

15. The method of claim 1, wherein an interior diameter of the lumens of the hollow fiber osmotic membranes is between 0.1 mm and 2.0 mm and the length of the hollow fiber osmotic membrane is between 0.25 m and 2.0 m.

16. The method of claim 1, wherein the feed water passes along the lumen of a continuous hollow fiber osmotic membrane or a series of sequentially connected hollow fiber osmotic membranes of total length between 0.25 m and 80 m and wherein the internal diameter of the lumen is between 0.1 mm and 2.0 mm.

* * * * *